(12) United States Patent
Pulaski

(10) Patent No.: US 10,042,677 B2
(45) Date of Patent: Aug. 7, 2018

(54) MAINTENANCE CONFLICT TOOL

(71) Applicant: BANK OF AMERICA CORPORATION, Charlotte, NC (US)

(72) Inventor: James C. Pulaski, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 15/164,227

(22) Filed: May 25, 2016

(65) Prior Publication Data

US 2017/0344402 A1  Nov. 30, 2017

(51) Int. Cl.
  *G06F 9/52* (2006.01)
(52) U.S. Cl.
  CPC .................... *G06F 9/52* (2013.01)
(58) Field of Classification Search
  CPC ....................................................... G06F 9/52
  See application file for complete search history.

(56) References Cited

U.S. PATENT DOCUMENTS

| 5,872,970 | A | 2/1999 | Pickett et al. |
| 8,892,375 | B2 | 11/2014 | Taft |
| 9,229,774 | B1 | 1/2016 | Wilkes |
| 2002/0143915 | A1 | 10/2002 | Mathieson |
| 2004/0153524 | A1* | 8/2004 | Kang .................. G06F 5/12 709/213 |
| 2007/0021116 | A1* | 1/2007 | Okita .................. G06F 8/65 455/428 |
| 2008/0295087 | A1* | 11/2008 | Kang .................. G06F 8/65 717/168 |
| 2010/0287553 | A1 | 11/2010 | Schmidt |
| 2013/0174140 | A1* | 7/2013 | Barthel .............. G06F 8/61 717/174 |
| 2015/0212819 | A1 | 7/2015 | Giroux |
| 2017/0076235 | A1* | 3/2017 | Noto ............ G06Q 10/06314 |

\* cited by examiner

*Primary Examiner* — Charlie Sun
(74) *Attorney, Agent, or Firm* — Michael A. Springs

(57) ABSTRACT

A job hold tool includes a memory, a conflict engine, a hold engine, and a start engine. The memory stores a maintenance schedule indicating a period of time during which maintenance is scheduled to occur and a job schedule indicating a plurality of scheduled start times for a plurality of jobs. The conflict engine identifies, based on the job schedule and the maintenance schedule, each job of the plurality of jobs whose scheduled start time is within the period of time. The hold engine holds each job identified by the conflict engine such that each held job will not start at its scheduled start time. The start engine starts each held job in response to a received notification that the maintenance is complete.

18 Claims, 3 Drawing Sheets

MAINTENANCE CONFLICT TOOL

TECHNICAL FIELD

This disclosure relates generally to a tool for resolving maintenance conflicts.

BACKGROUND

Applications and servers undergo maintenance to improve and/or maintain the operation of the applications and/or servers. During maintenance, the applications and/or servers may not perform their ordinary functions as expected, and so they may be taken offline.

SUMMARY OF THE DISCLOSURE

According to an embodiment, a job hold tool includes a memory, a conflict engine, a hold engine, and a start engine. The memory stores a maintenance schedule indicating a period of time during which maintenance is scheduled to occur and a job schedule indicating a plurality of scheduled start times for a plurality of jobs. The conflict engine identifies, based on the job schedule and the maintenance schedule, each job of the plurality of jobs whose scheduled start time or execution time is within the period of time. The hold engine holds each job identified by the conflict engine such that each held job will not start at its scheduled start time. The start engine starts each held job in response to a received notification that the maintenance is complete.

According to another embodiment, a method includes storing a maintenance schedule indicating a period of time during which maintenance is scheduled to occur and storing a job schedule indicating a plurality of scheduled start times for a plurality of jobs. The method also includes identifying, based on the job schedule and the maintenance schedule, each job of the plurality of jobs whose scheduled start time or execution time is within the period of time and holding each job identified by the conflict engine such that each held job will not start at its scheduled start time. The method further includes starting each held job in response to a received notification that the maintenance is complete.

According to yet another embodiment, a system includes a conflict engine, a hold engine, and a start engine. The conflict engine identifies, based on a job schedule indicating a plurality of scheduled start times for a plurality of jobs and a maintenance schedule indicating a period of time during which maintenance is scheduled to occur, each job of the plurality of jobs whose scheduled start time or execution time is within the period of time. The hold engine holds each job identified by the conflict engine such that each held job will not start at its scheduled start time. The start engine starts each held job in response to a received notification that the maintenance is complete.

Certain embodiments provide one or more technical advantages. For example, an embodiment improves the operation of a server by preemptively identifying and preventing job conflicts during maintenance windows. As another example, an embodiment improves the operation of a server by starting jobs that were stopped due to maintenance windows. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
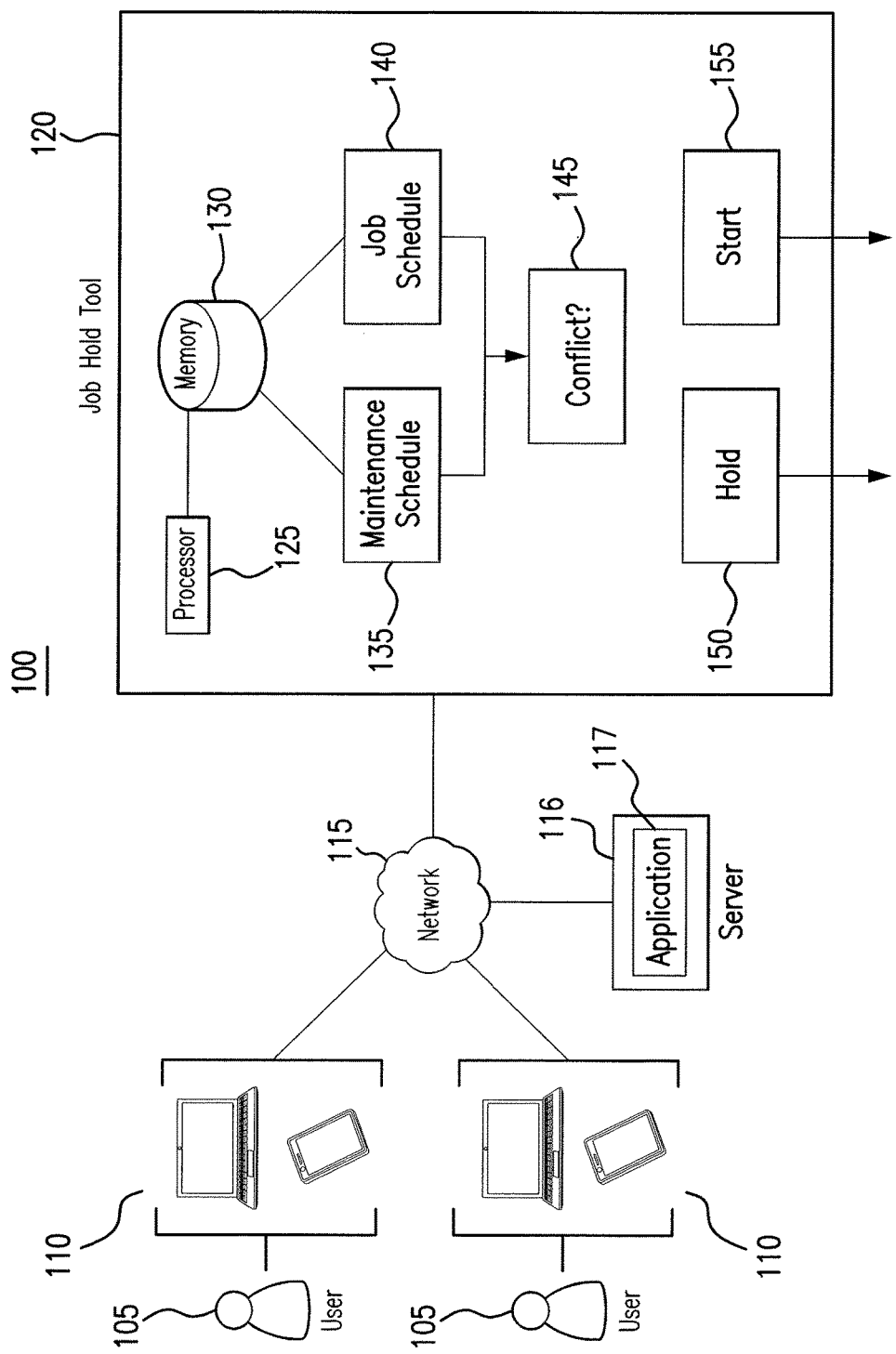
FIG. 1 illustrates a system for resolving maintenance conflicts.
Figure 2:
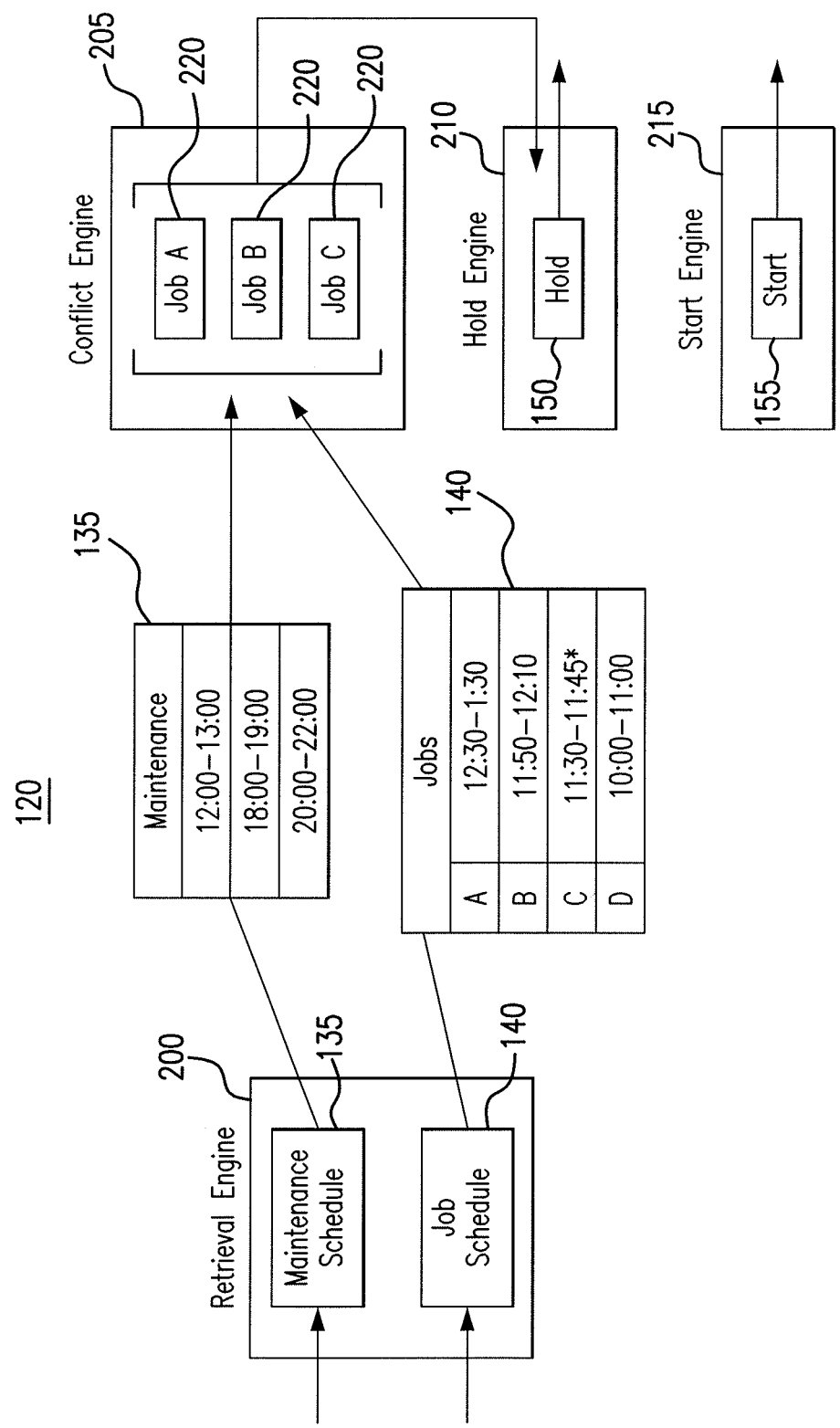
FIG. 2 illustrates the job hold tool of the system of FIG. 1 resolving maintenance conflicts.
Figure 3:
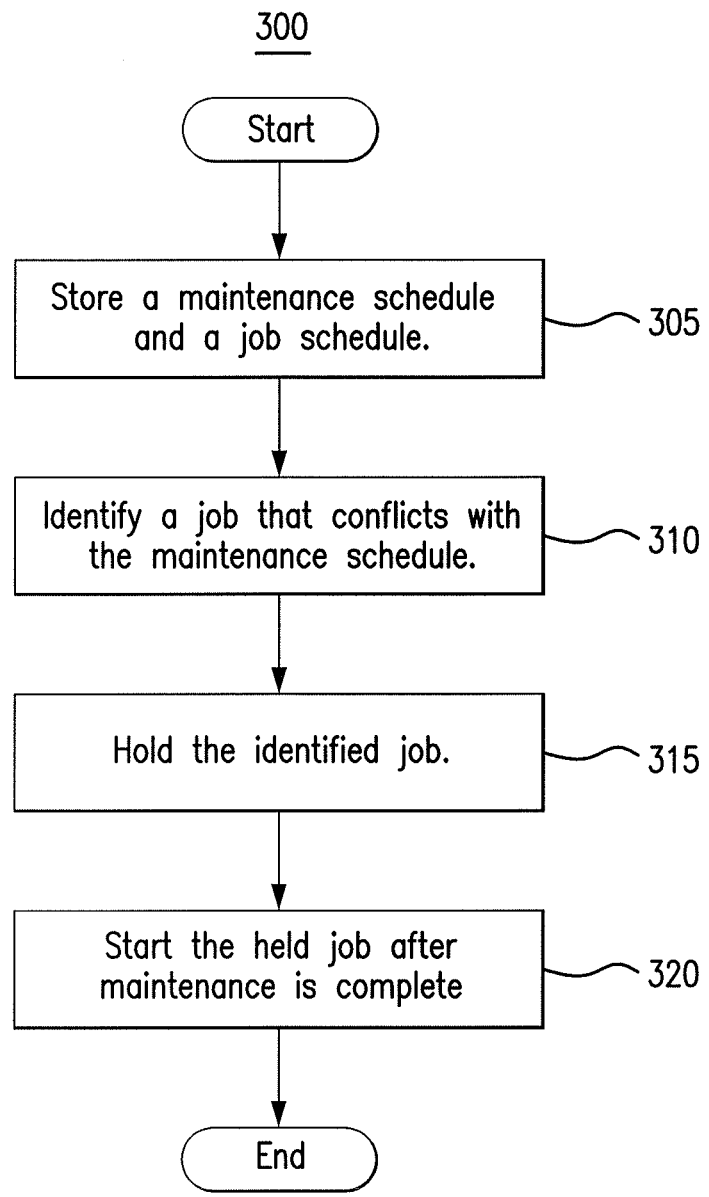
FIG. 3 is a flowchart illustrating a method for resolving maintenance conflicts using the system of FIG. 1.

Embodiments of the present disclosure and its advantages are best understood by referring to FIGS. 1 through 3 of the drawings, like numerals being used for like and corresponding parts of the various drawings.

Applications and servers undergo maintenance to improve and/or maintain the operation of the applications and servers. For example, an application may receive patches and/or updates that improve the operation of the application. As another example, servers may receive updates and patches to improve the operation and/or security of the server. Servers may also undergo maintenance to install new applications and/or to update and/or patch applications installed on the server. Therefore, maintenance is an important task in the operation of applications and servers.

During maintenance, the applications and servers may not perform their ordinary functions as expected. For example, maintenance may slow an application and/or server to the point where the application and/or server is unusable. As another example, maintenance may prevent certain applications and servers from responding to users. In some instances, applications and servers are taken offline during maintenance to prevent users from interacting with the applications and servers. In this manner, maintenance may be uninterrupted by users. As a result, maintenance has a higher likelihood of being successfully performed.

When a user requests an application or server to perform a task, a job is initiated against the server and/or the application. As the job is performed and/or carried out, the server and/or the application performs the task requested by the user. Certain jobs are executed frequently. To improve the efficiency of the application and/or the server, these jobs can be scheduled to execute at the frequencies desired. When a scheduled start time for a job is reached, the job is automatically run against the server and/or the application.

Challenges arise when jobs are scheduled to run during a maintenance window. For example, if a job is scheduled to start while maintenance is being performed, the job may not execute properly because the server and/or the application is offline and/or undergoing maintenance. As a result, the job will run but will not perform the desired task.

This disclosure contemplates a tool that preemptively identifies scheduled jobs that will conflict with a maintenance window. The tool will hold any identified jobs so that they do not run during the maintenance window. After the maintenance window is complete, the tool can start the jobs that were being held. In this manner, the tool resolves maintenance conflicts.

In particular embodiments, the tool improves the operation of applications and/or servers by preemptively identifying and preventing job conflicts during maintenance windows. In some embodiments, the tool improves the operation of a server by starting jobs that were stopped due to maintenance windows. The tool also improves maintenance by ensuring that scheduled jobs do not interrupt maintenance thereby improving the performance of servers and/or applications. The tool will be described using FIGS. 1 through 3. FIG. 1 will describe the tool generally. FIGS. 2 and 3 will describe the tool in more detail.

FIG. 1 illustrates a system 100 for resolving maintenance conflicts. As illustrated in FIG. 1, system 100 includes one or more devices 110, a network 115, server 116, and a job hold tool 120. In particular embodiments, system 100 improves the operation of an application and/or a server by holding jobs that conflict with a maintenance window. In this manner, the jobs will not run with errors and the maintenance window will not be interrupted by scheduled jobs.

Devices 110 may interact with any component of system 100. For example, devices 110 may request and/or initiate jobs against an application and/or a server. Devices 110 can establish maintenance schedules and/or job schedules. Devices 110 can also be used to alert other components of system 100 when maintenance is complete. Devices 110 can perform certain tasks by initiating jobs against an application or a server. If the job is run periodically or regularly, device 110 may be used to schedule the job such that the job automatically executes without prompting from device 110. The job schedule may indicate a time at which the job is to run. When that time arrives the job is automatically run against the application or the server.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 116 may be any system that executes applications 117. Certain tasks may be performed by server 116 and/or application 117 by initiating jobs against server 116 and/or application 117. Devices 110 may initiate jobs against server 116 and/or application 117. Maintenance may be performed on server 116 and/or application 117 to improve the performance of server 116 and/or application 117. For example, updates and patches may be applied to server 116 and/or application 117 that improve, for example, the security of server 116 and/or application 117. During maintenance, server 116 and/or application 117 may become unusable. For example, maintenance may cause server 116 and application 117 to perform slowly. As another example, maintenance may cause server 116 and/or application 117 to become unresponsive. As a result, in some instances server 116 and application 117 are taken offline during maintenance.

Because maintenance causes server 116 and/or application 117 to become unusable, in many instances, jobs that are scheduled to run during the maintenance window may not execute properly. As a result, these jobs may result in errors and/or incomplete executions. Because a user 105 may expect the job to execute properly according to its schedule, maintenance may cause results that a user does not expect. For example, a user may expect a certain job that updates data to be executed once per day. However, if that job does not execute properly due to maintenance then the user may begin using inaccurate data which the user believes has been updated.

This disclosure contemplates job hold tool 120 resolving maintenance conflicts. Job hold tool 120 includes processor 125 and memory 130. This disclosure contemplates processor 125 and memory 130 being configured to perform any of the operations of job hold tool 120 described herein. In particular embodiments, job hold tool 120 improves the operation of server 116 and/or application 117 by resolving maintenance conflicts.

Processor 125 is any electronic circuitry, including, but not limited to microprocessors, application specific integrated circuits (ASIC), application specific instruction set processor (ASIP), and/or state machines, that communicatively couples to memory 130 and controls the operation of database service tool 125. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of job hold tool 120 by processing information received from network 115, device(s) 110, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Job hold tool 120 stores both a maintenance schedule 135 and a job schedule 140. Maintenance schedule 135 may indicate the times at which maintenance is scheduled to begin. In some embodiments, maintenance schedule 135 also indicates an expected end time for each maintenance period. As a result, maintenance schedule 135 may indicate the expected duration of maintenance windows. Job schedule 140 indicates the start times for scheduled jobs. In some embodiments, job schedule 140 also indicates an expected end time for each scheduled job. In this manner, job schedule 140 indicates the expected run time of scheduled jobs.

Based on maintenance schedule 135 and job schedule 140, job hold tool 120 can determine whether a scheduled job will conflict with a maintenance window. For example, if a job is scheduled to begin during a maintenance window, then job hold tool 120 may determine that that job creates a maintenance conflict. As another example, job hold tool 120 may determine that a job has an expected end time within a maintenance window. As a result, job hold tool 120 may determine that that job causes a maintenance conflict. Job hold tool 120 may generate a conflict message 145 that indicates the jobs that conflict with certain maintenance windows. Job hold tool 120 may also generate a hold message 150 that instructs the jobs that conflict with a maintenance window to be held. Job hold tool 120 may communicate hold message 150 to other components of system 100 instructing that certain jobs be held. When the jobs are held, the jobs are prevented from executing at their scheduled start time. As a result, the jobs that conflict with a maintenance window are prevented from executing at their scheduled start time.

When maintenance is complete, job hold tool 120 may generate a start message 155 that instructs that held jobs should be started. Job hold tool 120 may communicate start message 155 to other components of system 100 to instruct those components to start jobs that were held due to maintenance. Held jobs may then be started and may execute properly.

In particular embodiments, job hold tool 120 improves the execution of server 116 and/or application 117 by holding jobs that cause maintenance conflicts. In this manner, maintenance on server 116 and/or application 117 is uninterrupted by scheduled jobs. In some embodiments, job hold tool 120 improves the operation of server 116 and/or application 117 by starting held jobs after maintenance is complete. In this manner, scheduled jobs are run successfully. The operation of job hold tool 120 will be described in more detail using FIGS. 2 and 3.

FIG. 2 illustrates the job hold tool 120 of the system 100 of FIG. 1 resolving maintenance conflicts. As illustrated in FIG. 2, job hold tool 120 includes a retrieval engine 200, a conflict engine 205, a hold engine 210, and a start engine 215. In particular embodiments, job hold tool 120 improves the operation of a server and/or application by holding scheduled jobs for the application and/or server that cause maintenance conflicts.

Retrieval engine 200 retrieves maintenance schedule 135 and job schedule 140. In particular embodiments, retrieval engine 200 retrieves maintenance schedule 135 and job schedule 140 from a memory of job hold tool 120. In some embodiments, retrieval engine 200 retrieves maintenance schedule 135 and job schedule 140 from another component of system 100 such as, for example, device 110 and/or server 116. An example algorithm for retrieval engine 200 is as follows: identify maintenance schedule 135; request maintenance schedule 135; receive maintenance schedule 135; identify job schedule 140; request job schedule 140; receive job schedule 140.

Maintenance schedule 135 indicates start times for certain maintenance windows. The maintenance may be for a server and/or an application. For example, the maintenance may involve updating and/or patching a server and/or an application. During maintenance the application and/or server may become unusable. In some embodiments, maintenance schedule 135 also indicates an expected end time of the maintenance window. As a result, maintenance schedule 135 may indicate a duration of each maintenance window. In the illustrated example of FIG. 2, maintenance is scheduled to begin between 12:00 and 1:00 in the afternoon, between 6:00 and 7:00 in the evening, and between 8:00 and 10:00 at night.

Job schedule 140 may indicate the scheduled jobs and their scheduled start times. In some embodiments, job schedule 140 also indicates an expected end time for each scheduled job. As a result, job schedule 140 may indicate a duration for each scheduled job. In the absence of maintenance windows, the scheduled jobs will execute at their scheduled start time and are expected to continue execution until their expected end time. In the illustrated example of FIG. 2, job A is scheduled to start at 12:30 and is expected to finish at 1:30 in the afternoon. Job B is scheduled to start at 11:50 in the morning and is expected to finish at 12:10 in the afternoon. Job C is scheduled to begin at 11:30 in the morning and is expected to finish at 11:45 in the morning. Job D is scheduled to begin at 10:00 in the morning and is expected to finish at 11:00 in the morning.

In some embodiments, certain jobs are scheduled to execute periodically. For example, job C may be scheduled to run every 20 minutes. Job schedule 140 indicates job C is a frequently executed job with an asterisk. This disclosure contemplates job schedule 140 and/or any component of system 100 indicating a job is executed periodically, frequently, and/or multiple times per day in any manner.

Conflict engine 205 identifies, based on maintenance schedule 135 and job schedule 140, the scheduled jobs 220 that are going to cause maintenance conflicts. For example, conflict engine 205 may identify the scheduled jobs 220 that are scheduled to begin during a maintenance window. As another example, conflict engine 205 may identify the jobs 220 that are scheduled to end during a maintenance window. In the illustrated example of FIG. 2, conflict engine 205 identifies job A because job A is scheduled to begin during the maintenance window starting at 12:00 and ending at 1:00 in the afternoon. Furthermore, conflict engine 205 identifies job B because job B is scheduled to end during the maintenance window starting at 12:00 and ending at 1:00 in the afternoon. If job A were to start at its scheduled time, job A would start executing at a time when maintenance is ongoing. If job B were to start at its scheduled time, job B would be executing at a time when maintenance begins. Therefore, both job A and job B present maintenance conflicts. An example algorithm for conflict engine 205 is as follows: determine a start time and an end time for maintenance window; determine a start time and an end time for a job; determine whether the job is scheduled to be executing during the maintenance window; if the job is scheduled to be executing during the maintenance window, identify the job as causing a maintenance conflict.

In some embodiments, conflict engine 205 may identify jobs 220 that fall within a buffer time before maintenance is to begin. For example, conflict engine 205 may implement a 30 minute buffer window before maintenance begins in which jobs are not to be executed. In the illustrated example of FIG. 2, conflict engine 205 may identify job C as causing a maintenance conflict if conflict engine 205 implemented a 30 minute buffer window because job C is scheduled to start and/or will be executing within the 30 minute window before the maintenance window between 12:00 and 1:00 in the afternoon. As a result of the 30 minute buffer window, conflict engine 205 would also hold jobs that were scheduled to begin at any time within 30 minutes before a maintenance window is scheduled to begin or within 30 minutes after a maintenance window is scheduled to end.

Conflict engine 205 may not identify job D as causing a maintenance conflict because job D is scheduled to start and end an hour before the first maintenance window is scheduled to begin. In some embodiments, conflict engine 205 may not even evaluate job D if job D is not associated with a server and/or application that is undergoing maintenance during the scheduled maintenance windows. For example, the first maintenance window may be for maintenance on a particular application. If job D is executed for a different application, then conflict engine 205 may identify job D as being for a different application and ignore job D in its analysis for conflicts.

In some embodiments, conflict engine 205 may identify jobs 220 that run frequently and/or more than once per day as causing maintenance conflicts. For example, job C may cause a maintenance conflict because it is scheduled to run every twenty minutes (even though the indicated start and end times for job C fall outside a maintenance window). However, because job C will run every twenty minutes, it will cause maintenance conflicts during every scheduled maintenance window. As a result, conflict engine 205 will identify job C as causing maintenance conflicts for each maintenance window shown in maintenance schedule 135.

Hold engine 210 receives the jobs identified by conflict engine 205 and holds those jobs 220. In some embodiments, hold engine 210 generates a hold message 150 that instructs the jobs 220 identified by conflict engine 205 to be held. Hold engine 210 may then communicate hold message 150 to other components of system 100 to hold jobs 220 identified by conflict engine 205. In the illustrated example of FIG. 2, hold engine 210 and/or hold message 15 may indicate that job A, job B, and job C should be held. An example algorithm for hold engine 210 is as follows: receive identification of jobs 220 from conflict engine 210; generate hold message identifying jobs 220; communicate hold message to other components of system 100.

Start engine 215 starts held jobs after maintenance is complete. In some embodiments, a user may indicate to job hold tool 120 and/or start engine 215 that maintenance is complete. Start engine 215 may start held jobs in response to receiving that notification that maintenance is complete. Start engine 215 may generate a start message 155 that indicates the jobs 220 that should be started. In the illustrated example of FIG. 2, start message 155 may indicate that job A, job B and job C should be started. Start engine 215 may then communicate start message 155 to other components of system 100 to start the held jobs. An example algorithm for start engine 215 is as follows: wait for a notification that maintenance is complete; receive notification that maintenance is complete; generate start message 155 that identifies held jobs; communicate start message 155 to other components of system 100.

In one embodiment, start engine 215 starts held jobs in this order: (1) jobs that are scheduled to be executed one or more times each hour, and (2) other jobs scheduled for execution one or more times per day, in the order in which they are scheduled. For example, if Job A and Job B are scheduled to run at 11 AM and 11:30 AM, respectively, Job A will be released from hold first, followed by Job B.

In particular embodiments, start engine 215 starts held jobs in a particular order. For example, start engine 215 may first start jobs that are scheduled to execute frequently and/or multiple times per day, such as, for example, job C if job C were scheduled to run every 20 minutes. Then start engine 215 may start jobs that are scheduled to run not as frequently (e.g., once per day or fewer). In the illustrated example of FIG. 2, start engine 215 may start job C first because job C may be scheduled to run every 20 minutes and/or multiple times per day. Then start engine 215 may start jobs A and B because jobs A and B are scheduled to run only once per day (or even less frequently).

In some embodiments, job hold tool 120 includes a logging engine that maintains a log indicating each held job. For example, the logging engine may log that jobs A, B and C are held jobs. The log may also indicate the times at which jobs A, B and C are held and the maintenance windows that are scheduled to occur at those times. An example algorithm for the logging engine is as follows: wait for held jobs from conflict engine 205; receive held jobs from conflict engine 205; add held jobs to a log.

In particular embodiments, job hold tool 120 includes a verification engine that verifies whether each held job will or will not start at its scheduled start time during the maintenance window. As a result, the verification engine performs a secondary check to ensure that the jobs identified by conflict engine 205 should be held. An example algorithm for the verification engine is as follows: wait for identification of jobs from conflict engine 205; receive identified jobs from conflict engine 205; determine whether each identified job will or will not start during a scheduled maintenance window.

In particular embodiments, by using job hold tool 120 the operation of an application or a server is improved because job hold tool 120 resolves maintenance conflicts. In some embodiments, job hold tool 120 improves the operation of the server and/or the application by holding jobs that are scheduled to be executing during a maintenance window.

FIG. 3 is a flowchart illustrating a method 300 for resolving maintenance conflicts using the system 100 of FIG. 1. In particular embodiments, job hold tool 120 performs method 300. By performing method 300, job hold tool 120 improves the operation of an application and/or server by holding jobs that cause maintenance conflicts.

Job hold tool 120 begins by storing a maintenance schedule and a job schedule in step 305. In step 310, job hold tool 120 identifies a job that conflicts with the maintenance schedule. Job hold tool 120 then holds the identified job in step 315. In step 320, job hold tool 120 starts the held job after maintenance is complete.

Modifications, additions, or omissions may be made to method 300 depicted in FIG. 3. Method 300 may include more, fewer, or other steps. For example, steps may be performed in parallel or in any suitable order. While discussed as database load tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A job hold tool comprising:
a memory configured to store:
a maintenance schedule indicating a period of time during which maintenance is scheduled to occur; and
a job schedule indicating:
a first scheduled start time and a first scheduled end time for a first job;
a second scheduled start time and a second scheduled end time for a second job;
a third scheduled start time and a third scheduled end time for a third job; and
a fourth scheduled start time and a fourth scheduled end time for a fourth job;
a conflict engine configured to:
determine that the first scheduled start time is within the period of time;
in response to the determination that the first scheduled start time falls within the period of time, identify the first job as presenting a maintenance conflict;
determine that the second scheduled end time is within the period of time;
in response to the determination that the second scheduled end time is within the period of time, identify the second job as presenting a maintenance conflict;
determine that one or more of the third scheduled start time and the third scheduled end time is within a buffer window before the period of time;
in response to the determination that one or more of the third scheduled start time and the third scheduled end time is within the buffer window, identify the third job as presenting a maintenance conflict; and
determine that the fourth scheduled start time and the fourth scheduled end time are not within the buffer window; and
in response to the determination that the fourth scheduled start time and the fourth scheduled end time are not within the buffer window; identify the fourth job as not presenting a maintenance conflict;
a hold engine configured to hold the first job, the second job, and the third job such that each held job will not start at its scheduled start time;
a start engine configured to start the first job, the second job, and the third job in response to a received notification that the maintenance is complete.

2. The job hold tool of claim 1, wherein:
the maintenance is for an application; and
the conflict engine is further configured to identify a job of the plurality of jobs that is executed by the application.

3. The job hold tool of claim 1, wherein starting each held job comprises:
starting a first plurality of held jobs, each job of the first plurality of held jobs is scheduled to start multiple times per day; and
after starting the first plurality of held jobs, starting a second plurality of held jobs based on the scheduled start times of the second plurality of held jobs.

4. The job hold tool of claim 1, further comprising a logging engine configured to maintain a log indicating each held job.

5. The job hold tool of claim 1, further comprising a verification engine configured to verify, for each held job, that the held job will not start at its scheduled start time during the period of time.

6. The job hold tool of claim 1, wherein:
each job of the plurality of jobs has a predicted duration of execution; and
the conflict engine is further configured to identify each job of the plurality of jobs whose predicted duration of execution overlaps with the period of time.

7. A method comprising:
storing a maintenance schedule indicating a period of time during which maintenance is scheduled to occur;
storing a job schedule indicating:
a first scheduled start time and a first scheduled end time for a first job;
a second scheduled start time and a second scheduled end time for a second job;
a third scheduled start time and a third scheduled end time for a third job; and
a fourth scheduled start time and a fourth scheduled end time for a fourth job;
determining that the first scheduled start time is within the period of time;
in response to the determination that the first scheduled start time falls within the period of time, identifying the first job as presenting a maintenance conflict;
determining that the second scheduled end time is within the period of time;
in response to the determination that the second scheduled end time is within the period of time, identifying the second job as presenting a maintenance conflict;
determining that one or more of the third scheduled start time and the third scheduled end time is within a buffer window before the period of time;
in response to the determination that one or more of the third scheduled start time and the third scheduled end time is within the buffer window, identifying the third job as presenting a maintenance conflict; and
determining that the fourth scheduled start time and the fourth scheduled end time are not within the buffer window; and
in response to the determination that the fourth scheduled start time and the fourth scheduled end time are not within the buffer window; identifying the fourth job as not presenting a maintenance conflict;
holding the first job, the second job, and the third job such that each held job will not start at its scheduled start time;
starting the first job, the second job, and the third job in response to a received notification that the maintenance is complete.

8. The method of claim 7, further comprising identifying each job of the plurality of jobs that is executed by an application affected by the maintenance.

9. The method of claim 7, wherein starting each held job comprises:
starting a first plurality of held jobs, each job of the first plurality of held jobs is scheduled to start multiple times per day; and
after starting the first plurality of held jobs, starting a second plurality of held jobs based on the scheduled start times of the second plurality of held jobs.

10. The method of claim 7, further comprising maintaining a log indicating each held job.

11. The method of claim 7, further comprising verifying, for each held job, that the held job will not start at its scheduled start time during the period of time.

12. The method of claim 7, further comprising identifying each job of the plurality of jobs whose predicted duration of execution overlaps with the period of time.

13. A system comprising:
a conflict engine configured to use a maintenance schedule indicating a period of time during which maintenance is scheduled to occur and a job schedule indicating:
- a first scheduled start time and a first scheduled end time for a first job;
- a second scheduled start time and a second scheduled end time for a second job;
- a third scheduled start time and a third scheduled end time for a third job; and
- a fourth scheduled start time and a fourth scheduled end time for a fourth job; to:
- determine that the first scheduled start time is within the period of time;
- in response to the determination that the first scheduled start time falls within the period of time, identify the first job as presenting a maintenance conflict;
- determine that the second scheduled end time is within the period of time;
- in response to the determination that the second scheduled end time is within the period of time, identify the second job as presenting a maintenance conflict;
- determine that one or more of the third scheduled start time and the third scheduled end time is within a buffer window before the period of time;
- in response to the determination that one or more of the third scheduled start time and the third scheduled end time is within the buffer window, identify the third job as presenting a maintenance conflict; and
- determine that the fourth scheduled start time and the fourth scheduled end time are not within the buffer window; and
- in response to the determination that the fourth scheduled start time and the fourth scheduled end time are not within the buffer window; identify the fourth job as not presenting a maintenance conflict;

a hold engine configured to hold the first job, the second job, and the third job such that each held job will not start at its scheduled start time;

a start engine configured to start the first job, the second job, and the third job in response to a received notification that the maintenance is complete.

14. The system of claim 13, wherein:
the maintenance is for an application; and
the conflict engine is further configured to identify each job of the plurality of jobs that is executed by the application.

15. The system of claim 13, wherein starting each held job comprises:
starting a first plurality of held jobs, each job of the first plurality of held jobs is scheduled to start multiple times per day; and
after starting the first plurality of held jobs, starting a second plurality of held jobs based on the scheduled start times of the second plurality of held jobs.

16. The system of claim 13, further comprising a logging engine configured to maintain a log indicating each held job.

17. The system of claim 13, further comprising a verification engine configured to verify, for each held job, that the held job will not start at its scheduled start time during the period of time.

18. The system of claim 13, wherein:
each job of the plurality of jobs has a predicted duration of execution; and
the conflict engine is further configured to identify each job of the plurality of jobs whose predicted duration of execution overlaps with the period of time.

* * * * *